April 25, 1933.  M. S. McKELLAR  1,905,039
ANTIFRICTION THREAD FOR SHAFTS
Filed May 16, 1931
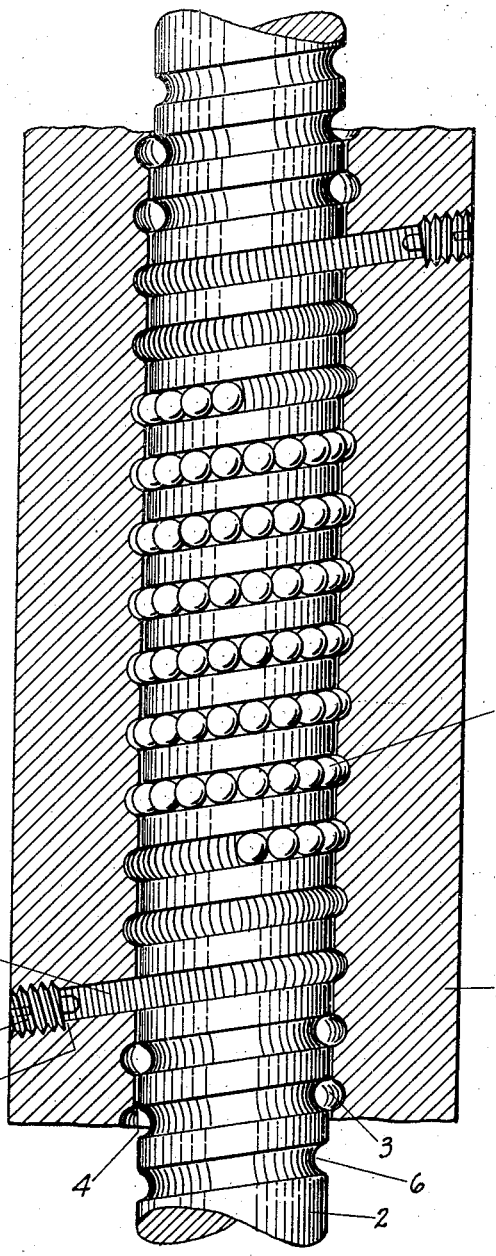
Marion S. McKellar
INVENTOR
BY Jesse R. Stone
ATTORNEY Patented Apr. 25, 1933

1,905,039

UNITED STATES PATENT OFFICE

MARION S. McKELLAR, OF HOUSTON, TEXAS, ASSIGNOR TO HUGHES TOOL COMPANY, OF HOUSTON, TEXAS, A CORPORATION OF TEXAS

ANTIFRICTION THREAD FOR SHAFTS

Application filed May 16, 1931. Serial No. 537,982.

My invention relates to threaded shafts and the like.

It is an object of the invention to provide a shaft, rod, or the like with a nut or support.

I desire to provide mating spiral grooves in the shaft and the nut to receive a series of balls adapted to roll therein. The invention contemplates a limited travel of said balls in the groove and resilient means at each end to limit the travel of said balls.

In the drawing herewith, the figure shows a central longitudinal section through a threaded nut or support made according to my invention, the shaft and balls being in elevation.

The member 1 may be an elongated nut, support, housing or the like through which the shaft 2 is to be screwed. The nut 1 has a half round spiral groove 3 on the inner wall of the longitudinal passage 4 therein, said groove being adapted to receive balls 5.

The shaft 2 is cylindrical and has a groove 6 therein adapted to mate with the groove 3 in the nut and thus form a channel in which the balls 5 may roll.

At each end of the nut 1, I hold the balls 5 in position within the nut and limit their travel toward either end of said nut by a coiled spring 7. I show a spring 7 at each end of the nut housed in the groove 3 and having its outer end extended tangentially to the shaft into a recess 8 in the nut, closed at its outer end by a threaded plug 9.

It will be noted that the nut may be easily screwed along the shaft for a limited distance, the balls compressing the spring at the end toward which they are moved by the rotation of the shaft relative to the nut. This structure is adapted for use on valve stems or the like where the travel of the valve stem is short in either direction. Manifestly, it is adapted for general application.

What I claim as new is:

1. A shaft, a nut thereon, said shaft and nut having mating spiral grooves therein forming screw threads, a single row of balls movable in said grooves, and a single spring at each end of said grooves bearing against said row of balls, to limit the movement of said balls toward either end of said nut.

2. A shaft, a nut thereon, said shaft and nut having mating spiral grooves forming screw threads, a single row of balls movable in said grooves, and springs in said grooves at each end of said nut to limit the travel of said nut in either direction.

In testimony whereof, I hereunto affix my signature, this the 4th day of May, A. D. 1931.

MARION S. McKELLAR.